Jan. 24, 1933. M. C. FRINS 1,894,986
UNIVERSAL JOINT
Filed April 13, 1931    2 Sheets-Sheet 1
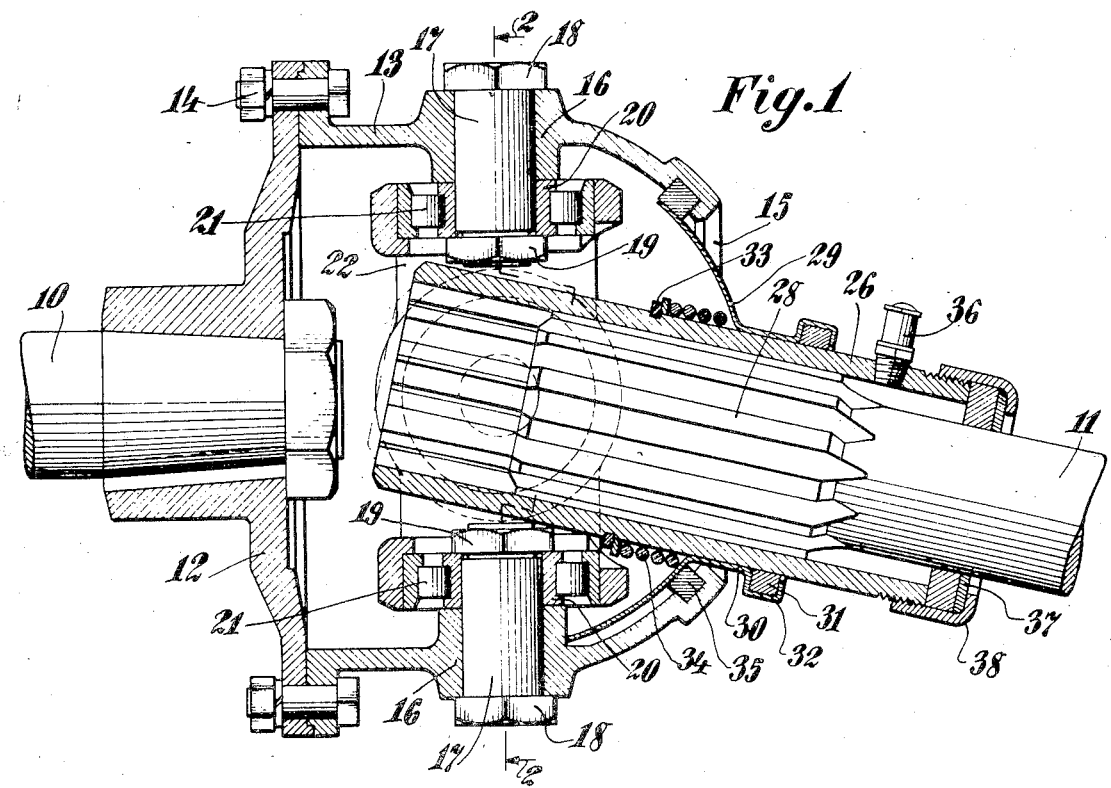
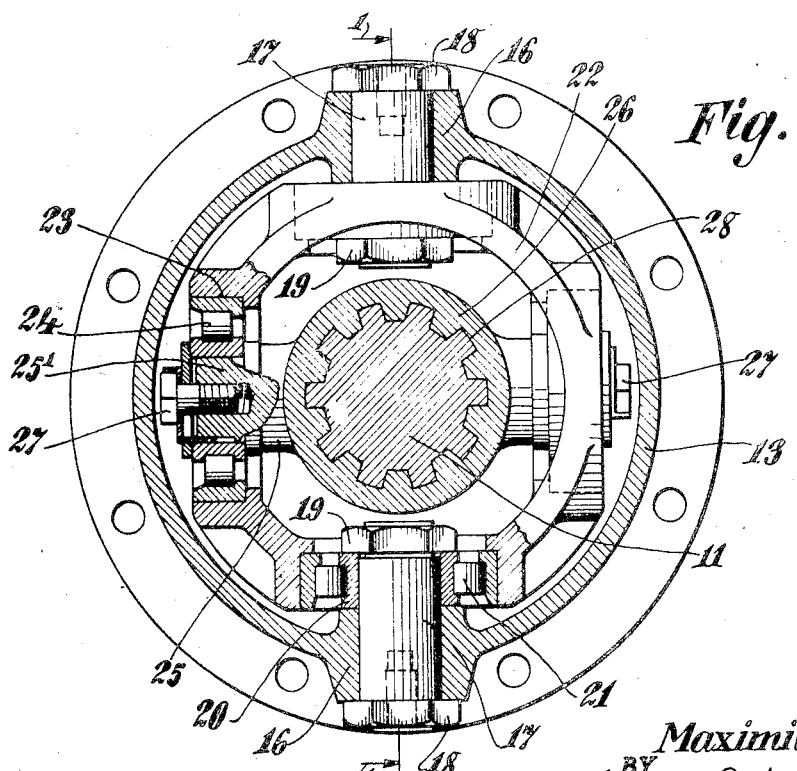
INVENTOR
Maximilian C. Frins,
BY Redding, Greeley, O'Shea & Campbell
HIS ATTORNEYS INVENTOR
Maximilian C. Frins,
BY Redding, Greeley, O'Shea & Campbell
HIS ATTORNEYS Patented Jan. 24, 1933

1,894,986

UNITED STATES PATENT OFFICE

MAXIMILIAN C. FRINS, OF WATCHUNG, NEW JERSEY, ASSIGNOR TO INTERNATIONAL MOTOR COMPANY, OF NEW YORK, N. Y., A CORPORATION OF DELAWARE

UNIVERSAL JOINT

Application filed April 13, 1931. Serial No. 529,595.

The present invention relates to universal joints and embodies, more specifically, an improved form of universal joint, wherein the friction which exists in universal joints now available is substantially eliminated and the joint rendered far more efficient. The inefficiency of universal joints of the type now available is a matter which has been extremely difficult of solution in view of the compactness of the parts and comparative size of the mechanism. Standard universal joints of the type now available have comprised elements assembled and connected by means of trunnion bearings in such fashion that the relatively movable parts are connected by plane bearings. In order to provide a universal joint which is formed of elements connected through anti-friction bearings, the present invention has been designed and an object thereof is to provide a universal joint, wherein the friction of the joint is greatly reduced over joints now available.

A further object of the invention is to provide a universal joint having the relatively movable elements thereof connected through anti-friction bearings.

A further object of the invention is to provide a joint of the above character, wherein the joint seal is of a materially improved form.

Further objects, not specifically enumerated above, will be apparent as the invention is described in greater detail in connection with the accompanying drawings, wherein:

Figure 1 is a view in section, taken through the longitudinal axis and on the plane indicated by the line 1—1 in Figure 2, looking in the direction of the arrows and showing a universal joint constructed in accordance with the present invention.

Figure 2 is a view in section, taken on line 2—2 of Figure 1, and looking in the direction of the arrows.

Figure 3:
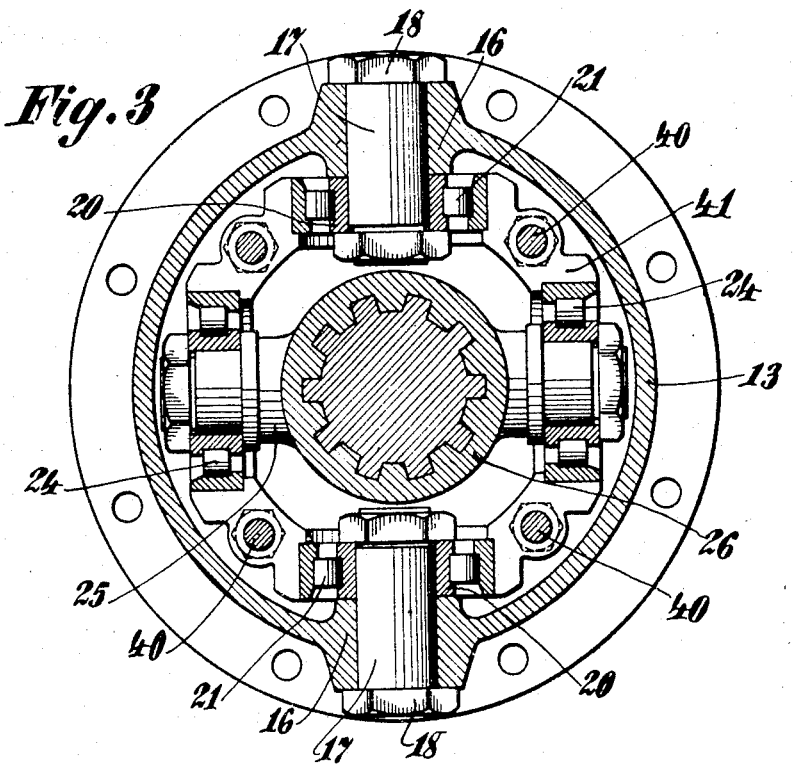
Figure 3 is a view similar to Figure 2, showing a modified form of joint.

Referring to the above drawings, and particularly Figures 1 and 2, driving and driven shafts are shown at 10 and 11. The shaft 10 is keyed to a plate 12 to which a housing 13 is bolted by means of bolts 14. This housing is formed with an opening 15 and is provided with aligned journal bearings 16 which receive trunnion pins 17. In the form of the invention shown in Figures 1 and 2, the trunnion pins 17 are formed as bolts having heads 18 and nuts 19. The bolts thus secure races 20 in position and mount anti-friction bearings 21 upon which a driving ring 22 is journaled. Transversely to the axis of the pins 17, the driving ring is formed with aligned apertures 23 within which anti-friction bearings 24 are secured. Bearings 24 thus serve as trunnion bearings for receiving arms 25 which are formed upon a sleeve 26. The arms 25 are formed with extensions 25' of reduced diameter upon which the anti-friction bearings 24 are mounted, pins 27 serving to secure the bearings in position.

Shaft 11 is splined, as indicated at 28, and the sleeve 26 is formed with grooves within which splines 28 are received. In this fashion, relative axial movement of the shaft 11 with respect to the housing 13 is permitted.

A metallic shield 29 is formed of spherical section and provided with a sleeve 30 which snugly fits over the sleeve 26. Sealing material 31 is provided within an annular struckup portion 32 of the sleeve 30 to effect the sealing of the joint between the shield 29 and sleeve 26. A flange 33 is carried by the sleeve 26 and serves as a seat against which spring 34 engages, the other end of the spring engaging the spherical shield 29. The spring 34 thus seats the shield 29 against an annular sealing washer 35, carried by the housing 13.

In order that lubricant may be supplied to the sleeve 26, a fitting 36 is provided thereon and the space between the shaft 11 and sleeve 26 is sealed by means of sealing washers 37 which are secured in position by means of cap sleeves 38.

In the construction shown in Figure 3, the driving ring is formed of two sections, split upon an axis perpendicular to the axis of the joint, and secured together by means of bolts 40. One of the sections is indicated at 41 and is shown as adapted to be secured to a cooperating section to mount the anti-friction bearings in position. This form of joint greatly facilitates the assembly of the mechanism, as well as the inspection and repair thereof.

Figure 4:
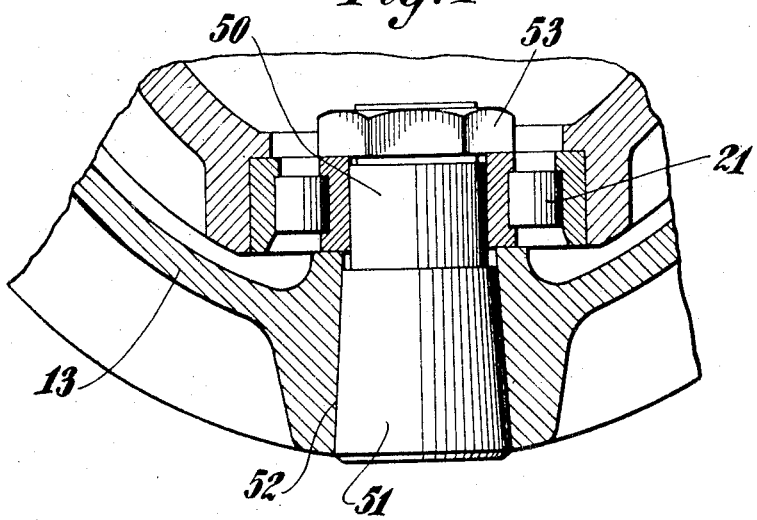
Figure 4 is an enlarged detailed view in section, showing an improved trunnion mounting for a universal joint constructed in accordance with the present invention.

In the construction shown in Figure 4, trunnion pins 50 are shown as provided with tapering heads 51 received in tapering recesses 52 formed in the housing 13. Nuts 53 are provided to seat the trunnion pins and secure the anti-friction bearings 21 in position.

It will be seen that the foregoing construction provides a universal joint whereof the friction is greatly reduced over devices of this kind which are now available. The provision of a structure which is adapted to receive anti-friction bearings, as shown herein, renders the joint highly efficient and imparts greater life thereto.

While the invention has been described with specific reference to the accompanying drawings, it is not to be limited, save as defined in the appended claim.

I claim as my invention:

A universal joint for driving and driven members comprising a housing carried by one of the members, a driving ring, opposed pins having tapered heads mounted in tapered recesses in the housing, the walls of the heads and recesses tapering from a maximum diameter adjacent the exterior of the housing to a minimum diameter adjacent the interior walls thereof, anti-friction bearings on the pins, means to secure the bearings to the pins, and anti-friction bearings between the ring and driven member upon an axis at right angles to the axis of the first bearings.

This specification signed this 9. day of April, A. D. 1931.

MAXIMILIAN C. FRINS.